US012623538B2

(12) United States Patent
Hofmann et al.

(10) Patent No.: US 12,623,538 B2
(45) Date of Patent: May 12, 2026

(54) DEVICE AND METHOD FOR DISPLAYING TRAFFIC SIGNS WITH A SUPPLEMENTARY SIGN

(71) Applicant: VOLKSWAGEN AKTIENGESELLSCHAFT, Wolfsburg (DE)

(72) Inventors: Martin Hofmann, Lehre (DE); Johanna Sandbrink, Braunschweig (DE); Norwin Schmidt, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 327 days.

(21) Appl. No.: 18/569,262

(22) PCT Filed: Jun. 15, 2022

(86) PCT No.: PCT/EP2022/066415
§ 371 (c)(1),
(2) Date: Dec. 12, 2023

(87) PCT Pub. No.: WO2023/280542
PCT Pub. Date: Jan. 12, 2023

(65) Prior Publication Data
US 2024/0367520 A1 Nov. 7, 2024

(30) Foreign Application Priority Data

Jul. 8, 2021 (DE) ..................... 10 2021 207 259.3

(51) Int. Cl.
*B60K 35/22* (2024.01)
*B60K 35/10* (2024.01)
(Continued)

(52) U.S. Cl.
CPC .............. *B60K 35/22* (2024.01); *B60K 35/10* (2024.01); *B60K 35/213* (2024.01); *B60K 35/28* (2024.01);
(Continued)

(58) Field of Classification Search
CPC ...... B60K 35/22; B60K 35/10; B60K 35/213; B60K 35/28; B60K 35/29; B60K 35/60;
(Continued)

(56) References Cited

U.S. PATENT DOCUMENTS

| | | | |
|---|---|---|---|
| 6,472,977 B1 | 10/2002 | Pöchmüller | |
| 7,236,089 B2 | 6/2007 | Ono et al. | |
| 9,436,879 B2 | 9/2016 | Zobel | |
| 12,017,584 B2* | 6/2024 | Stäbler | B60K 35/81 |
| 2005/0168330 A1* | 8/2005 | Ono | B60K 35/28 340/461 |

(Continued)

FOREIGN PATENT DOCUMENTS

| | | |
|---|---|---|
| DE | 19736774 A1 | 2/1999 |
| DE | 102005003920 A1 | 9/2005 |

(Continued)

OTHER PUBLICATIONS

International Search Report; International Patent Application No. PCT/EP2022/066415; Oct. 6, 2022.

*Primary Examiner* — Omeed Alizada
(74) *Attorney, Agent, or Firm* — BARNES & THORNBURG LLP

(57) ABSTRACT

A device for improved visualization of an indication in an instrument cluster of a transportation vehicle and a corresponding system, method and computer program. Due to the greatly limited display area of the mini-FID in the instrument cluster, the device displays traffic signs, supplementary signs and warning lights in one display region. The supplementary signs information is displayed in reduced size in
(Continued)

response to a warning light appearing above the traffic signs in the display region.

14 Claims, 5 Drawing Sheets

(51) Int. Cl.

| | |
|---|---|
| *B60K 35/21* | (2024.01) |
| *B60K 35/28* | (2024.01) |
| *B60K 35/29* | (2024.01) |
| *B60K 35/60* | (2024.01) |
| *B60K 37/00* | (2024.01) |

(52) U.S. Cl.
CPC .............. *B60K 35/29* (2024.01); *B60K 35/60* (2024.01); *B60K 37/00* (2013.01); *B60K 2360/168* (2024.01); *B60K 2360/1876* (2024.01); *B60K 2360/21* (2024.01)

(58) Field of Classification Search
CPC .............. B60K 37/00; B60K 2360/168; B60K 2360/1876; B60K 2360/21; B60K 2360/1523; B60K 2360/186
See application file for complete search history.

(56)                References Cited

U.S. PATENT DOCUMENTS

| | | | |
|---|---|---|---|
| 2012/0002053 A1* | 1/2012 | Stein ................ | G08G 1/096783 |
| | | | 348/148 |
| 2017/0174132 A1 | 6/2017 | Yokochi et al. | |
| 2022/0177067 A1* | 6/2022 | Sarmadh Ameer .... | B60K 35/28 |

FOREIGN PATENT DOCUMENTS

| | | | |
|---|---|---|---|
| DE | 102007004453 | A1 | 7/2008 |
| DE | 102011109387 | A1 | 2/2013 |
| DE | 102011116314 | A1 | 4/2013 |
| DE | 102014220373 | A1 | 4/2016 |
| DE | 102018004559 | A1 | 12/2018 |

* cited by examiner

DEVICE AND METHOD FOR DISPLAYING TRAFFIC SIGNS WITH A SUPPLEMENTARY SIGN

PRIORITY CLAIM

This patent application is a U.S. National Phase of International Patent Application No. PCT/EP2022/066415, filed 15 Jun. 2022, which claims priority to German Patent Application No. 10 2021 207 259.3, filed 8 Jul. 2021, the disclosures of which are incorporated herein by reference in their entireties.

SUMMARY

Illustrative embodiments relate to a device for improved visualization of a notification in an instrument cluster of a transportation vehicle and to a corresponding system, method and computer program.

BRIEF DESCRIPTION OF THE DRAWINGS

Exemplary embodiments will be explained below with reference to the drawings, in which.

DETAILED DESCRIPTION

Figure 1:
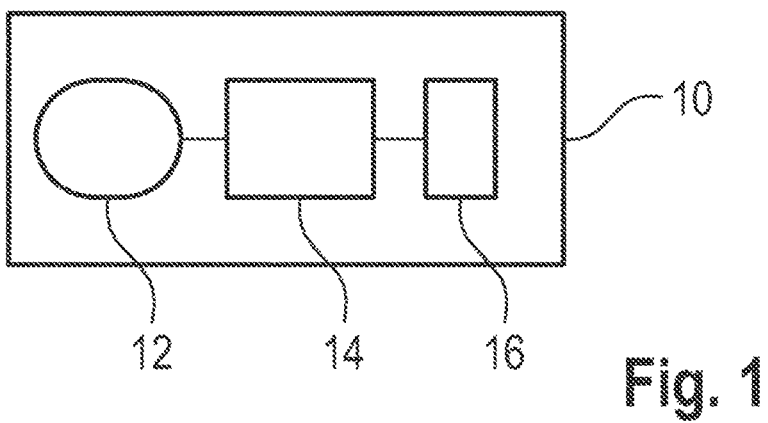
FIG. 1 shows a schematic representation of a device for improved visualization of a notification in an instrument cluster of a transportation vehicle.

It is known in modern transportation vehicles to provide the driver with traffic sign information. For example, a currently valid speed limit can be displayed as a traffic sign on the dashboard of the transportation vehicle. To determine the currently valid traffic sign information, the transportation vehicle may have various detection methods or mechanisms, such as a camera with an image processing unit. Furthermore, currently valid traffic sign information can be determined by electronic detection of radio signals that can transmit modern traffic signs, or from a database. In modern transportation vehicles, a wide variety of supplementary information and symbols to be displayed is provided. However, there is a lack of beneficial display options for the wide variety of symbols to display.

From the unexamined application DE 10 2007 004 453 A1, a method for reproducing traffic sign information in a transportation vehicle is known, wherein information on a traffic sign is reproduced in the transportation vehicle. In addition, reliability information describing the reliability of the displayed traffic sign information is output. The drawback of this is that a dedicated display panel is provided for reproducing the traffic sign information. As the amount of information communicated to a driver while driving increases, the required display area is increasing constantly. This results in cost-intensive and space-intensive display units.

From the unexamined application US 2017/174132 A1 it is known to recognize sign information of a traffic sign or road marking in front of a transportation vehicle. If two or more types of sign information with overlapping effective sections are detected, or if the sign information contains text information that contains a predetermined number of characters or more, simplified information obtained by simplifying the sign information is displayed on a Mobile Internet Device (MID) in the transportation vehicle. The drawback of this is that simplifying the text information is time-consuming and prone to errors. In particular, incorrectly simplified text information can lead to an increased traffic risk.

The disclosed embodiments provide an improved way of displaying multiple symbols on a limited display panel. In particular, multiple symbols are to be displayed in a comprehensible form.

This is achieved by a device for improved visualization of a notification in an instrument cluster of a transportation vehicle, having:

an input interface for receiving notification data containing information on the notification and indicator light data containing information on an operating state of the transportation vehicle, an analysis unit for determining a representation for the notification based on the notification data and the indicator light data and for generating a control command for controlling a display unit of the instrument cluster; and an output interface for transmitting the control command to the display unit of the instrument cluster, wherein the control command displays an indicator light symbol on a display panel of the display unit when the operating state of the transportation vehicle requires a message to be output by an indicator light symbol, and displays the notification in a reduced form if the available display area of the display panel is smaller than a display area required for a complete display of the notification.

The above is also achieved by a system for improved visualization of a notification in an instrument cluster of a transportation vehicle, having:

a device as previously defined; and a display unit, in particular, a display unit in the instrument cluster, for outputting an indicator light symbol and/or the notification in response to a control command of the device.

Finally, the above problem is achieved by a method for improved visualization of a notification in an instrument cluster of a transportation vehicle, having the operations of:

receiving notification data with information on the notification and indicator light data with information on an operating state of the transportation vehicle;

determining a representation for the notification based on the notification data and the indicator light data;

generating a control command for controlling a display unit of the instrument cluster; and transmitting the control command to the display unit of the instrument cluster, wherein the control command displays an indicator light symbol on a display panel of the display unit when the operating state of the transportation vehicle requires a message to be output by an indicator light symbol, and displays the notification in a reduced form if the available display area of the display panel is smaller than a display area required for a complete display of the notification.

By use of an input interface, a cost-effective device can be created, which can be used with existing systems, modules and units installed in the transportation vehicle. An input interface can be in a wired and/or wireless form and optionally support one or more communication protocols. By use of an analysis unit, a control command can be generated, which allows a dual use of an available display panel. Both a notification and an indicator light symbol can be displayed on the display panel. In particular, when no indicator light symbol is to be displayed, the display panel can be used to display notifications. Due to the fact that a representation can be determined based on the notification data and the indicator light data, a notification symbol can be accommodated dynamically and depending on the specific situation. This increases safety in road traffic. An output interface enables a cost-effective device to be provided that can be used with existing output devices. By using an input interface for receiving data, a technically simple and cost-effective device can be provided, which does not itself need to be designed for collecting the information. Thus, the device can be integrated into existing navigation or infotainment systems. By use of an output interface, components already installed in the transportation vehicle can be used for display.

In an exemplary embodiment, the output interface is designed to transmit the control command to a display unit, such as a mini-FID, and optionally designed for installation in a transportation vehicle and may be part of an on-board computer, infotainment and/or navigation system. This allows a cost-effective device to be created, which can be used with already installed systems. In particular, it is conceivable that the device can be created by an appropriate reprogramming of an electronic unit already installed in the transportation vehicle.

In a further exemplary embodiment, it is provided that the input interface is designed to receive notification data with information relating to recognized traffic signs, wherein the display of the notification comprises a display of the recognized traffic sign. Displaying the recognized traffic sign allows a driver to intuitively comprehend the notification. There is no need for a learning phase on the part of the driver. The convenience and acceptance of the system is increased.

In a further exemplary embodiment, it is provided that the analysis unit is designed to determine, based on the notification data, whether a recognized traffic sign comprises a main sign and/or a supplementary sign. By categorizing the traffic signs, supplementary information can be created for the driver. In particular, a classification of the signs can be carried out, for example, with regard to the permitted speed, a driving restriction and/or a validity range of the sign.

In a further exemplary embodiment, it is provided that the analysis unit is designed to prioritize a recognized main sign and/or a recognized supplementary sign, and to determine a control command which displays the traffic sign with low priority, such as a reduced output of a notification, in particular, as a placeholder. This can reliably ensure that the main information of the traffic sign can be communicated. A placeholder may be a symbol, such as a supplementary sign with three dots or an asterisk on a displayed main sign.

In a further exemplary embodiment, it is provided that the analysis unit assigns a recognized supplementary sign a lower priority than a recognized main traffic sign. This allows a reduced output of a notification which optionally does not include the main information. In particular, a previous prioritization allows the output of the notifications to be quickly updated if a new notification is added. A new notification can be overlaid directly and rapidly.

In a further exemplary embodiment, it is provided that the analysis unit assigns an indicator light symbol a higher priority than a recognized traffic sign. Indicator lights can include, in particular, information regarding a braking system, a battery, an oil level, a coolant temperature, an airbag, a seat belt sensor, brake wear, fuel level, an engine control system, tire pressure, an ABS and/or ESP. Optionally, the indicator light symbols correspond to the previously known symbols displayed in an analog instrument cluster. An indicator light therefore conveys information that can only be communicated to the driver by the transportation vehicle and that requires the driver's attention. As a result, a high priority of the indicator light symbols makes it technically simple to ensure that no restrictions occur that could result in damage to the transportation vehicle. In other words, a convenience function, such as sign recognition, may always be prioritized lower than the transmission of a critical operating state of the transportation vehicle.

Further exemplary embodiments are derived from the remaining features, referred to in the dependent claims.

The various disclosed embodiments cited in this application, unless stated otherwise for each case, can be combined with one another.

Mini-FIDs, or instrument carrier/information displays FIDs, are displays in an instrument cluster, wherein the FID can be used to transmit information to a driver. The instrument cluster is, in particular, an instrument block in transportation vehicles that consists of the combination of tachometer, odometer, revolution counter, fuel gauge, coolant temperature gauge and indicator lights, for example, for the direction indicator. The individual components can be in both digital and analog form.

A main traffic sign is a traffic sign which conveys a command or prohibition, such as an overtaking ban, a permitted maximum speed or the like.

A supplementary sign (Germany) or a supplementary plate (Austria, Switzerland) defines in more detail the meaning of a main traffic sign or signal, which it is usually placed next to.

FIG. 1 shows a schematic representation of a device 10 for improved visualization of a notification in an instrument cluster of a transportation vehicle. The device 10 comprises an input interface 12, an analysis unit 14 and an output interface 16.

The input interface 12 is designed to receive data comprising notification data with information on the notification and indicator light data containing information on an operating state of the transportation vehicle. The data can include, for example, sign recognition or the like. In particular, the data may originate from a sign recognition unit. In addition, the indicator light data may originate from a control unit of the transportation vehicle or a sensor system of the transportation vehicle. To receive the data, the input interface 12 may be connected to a vehicle-internal transmission network. Furthermore, the input interface 12 may also be designed for wireless communication or be connected to a proprietary, for example, wired, transmission network.

The analysis unit 14 is designed to receive the data and to generate a control command, wherein the control command displays an indicator light symbol on a display panel of the display unit when the operating state of the transportation vehicle requires a message to be output by an indicator light symbol. If an indicator light symbol is displayed, the control command displays the notification in a reduced form, since the available display area of the display panel is smaller than a display area required for a complete display of the notification. It goes without saying that the control command displays a non-reduced output of the notification if the available display area of the display panel is sufficiently large.

The analysis unit 14 determines a form of representation for the notification based on the notification data and the indicator light data. For example, a representation may comprise a pictogram of a recognized traffic sign. In particular, a reduced representation comprises outputting a placeholder, such as a supplementary sign with three dots. It goes without saying that other reduced representations, such as an asterisk or the like, are also conceivable. Furthermore, the reduced representation can overlap at least some sections of the pictogram.

Optionally, the analysis unit 14 is designed to divide the traffic signs into main traffic signs and supplementary signs and to prioritize different types of notification, wherein the indicator light symbols are prioritized higher than a traffic sign and a main traffic sign is prioritized higher than a supplementary sign.

The output interface 16 is designed to transmit the control command to a display unit of the instrument cluster. The output interface 16 can be designed for communication in the same way as the input interface 12. It goes without saying that the input interface 12 and the output interface 16 can also be combined as a communication interface for sending and receiving.

Figure 2:
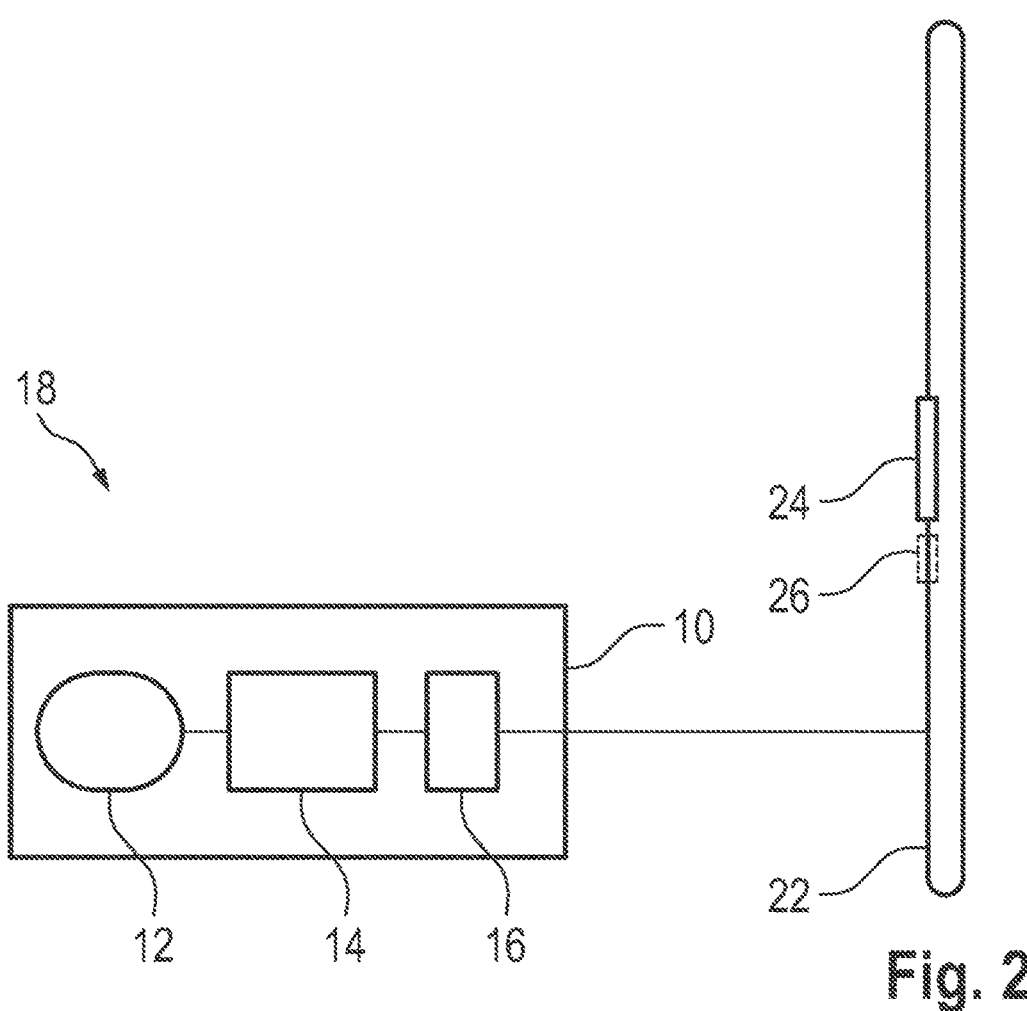
FIG. 2 shows a schematic representation of exemplary embodiment of a disclosed system.

FIG. 2 shows a schematic representation of a system 18 having a device 10 and a display unit 22.

The device 10 receives, as described above, data comprising notification data and/or indicator light data.

On the basis of the data, the device 10 creates a control command for the display unit 22 and thus effects a display of a notification 24 by the display unit 22 of a transportation vehicle. In the example shown, the control command also causes a notification to be output in a reduced representation 26, which is shown dashed in FIG. 2 for clarification.

Figure 3:
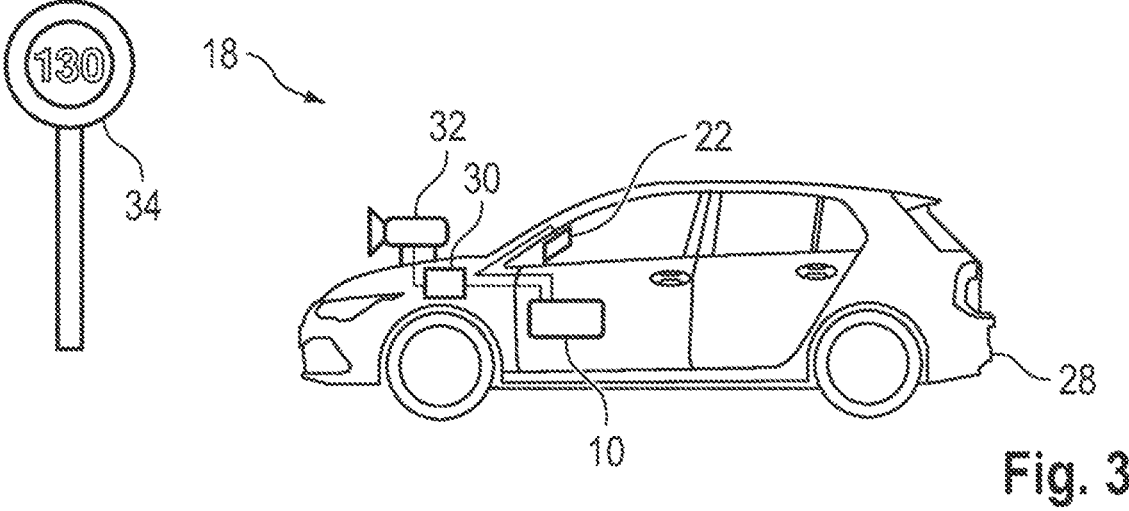
FIG. 3 shows a schematic representation of a further exemplary embodiment of a disclosed system in a transportation vehicle.

FIG. 3 shows a schematic representation of an exemplary embodiment of the system 18 in a transportation vehicle 28. The system 18 comprises a device 10, a display unit 22, and a sign recognition unit 30. It goes without saying that the device 10 can also communicate with a control unit of the transportation vehicle 28 to obtain indicator light data. For simplicity of presentation, the control unit is not explicitly shown.

The device 10 receives, as described above, data comprising notification data and/or indicator light data. In the example shown, the system 18 is connected to a unit for sign recognition 30 and optionally receives pre-processed data with information on recognized traffic signs 34. The unit for sign recognition 30 can identify a traffic sign 34 in front of the transportation vehicle 28, for example, by a front camera 32. It goes without saying that other sensors known in principle from the prior art can also be used. In particular, a sensor data fusion of data from multiple sensors can be carried out to achieve a higher data quality. Furthermore, the unit for sign recognition 30 and the device 10 may also be integrated into a control unit, navigation system and/or infotainment system of the transportation vehicle 28 and/or be created by reprogramming the above.

The device 10 analyzes the received data and determines a control command, which displays an indicator light symbol on a display panel of the display unit 22 when the operating state of the transportation vehicle 28 requires a message to be output by an indicator light symbol. Furthermore, the control command displays the notification in a reduced form 26 when the available display area of the display panel is smaller than a display area required for a complete display of the notification 24.

Figure 4:
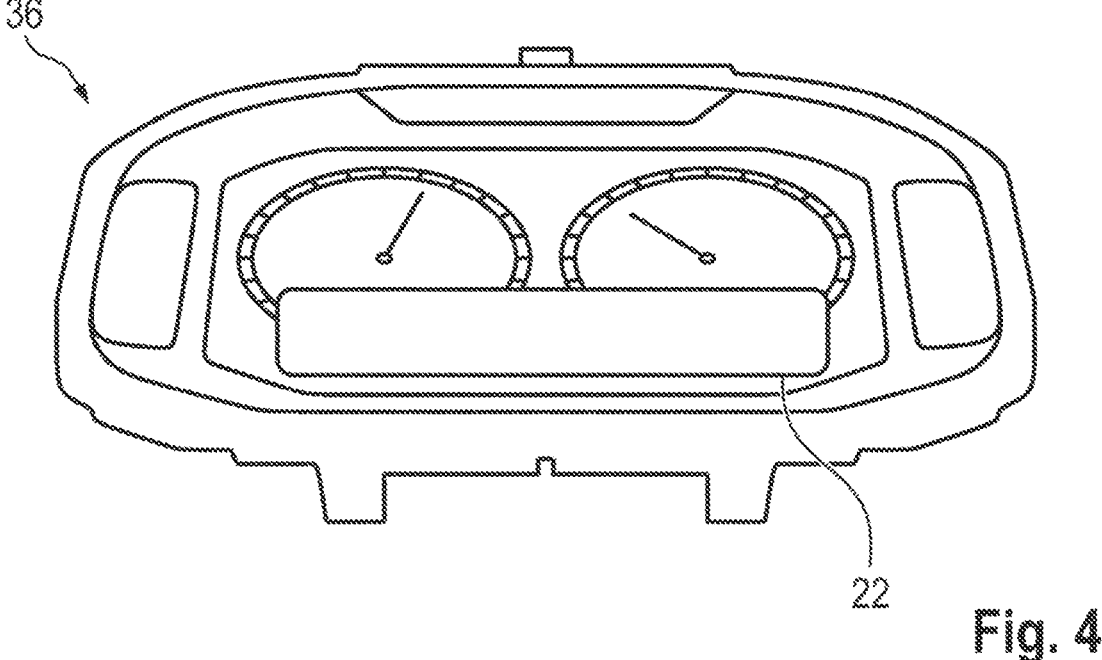
FIG. 4 shows a schematic representation of an instrument cluster with a display unit.

FIG. 4 shows a schematic representation of an instrument cluster 36 with a display unit 22, such as a mini-FID. The instrument cluster 36 has two analog indicator instruments, wherein the mini-FID is arranged between the analog indicator instruments. In a mini-FID, the available display area is comparatively small, since the display area is limited by the dimensioning of the instrument cluster 36 and the analog indicator instruments. This allows the teaching described here to be used particularly beneficial with mini-FIDs, since a dual use of the display area has high added value in small display areas. Furthermore, the display 26 of a notification in reduced form allows a high information density to be achieved despite a small display area.

In FIGS. 5a to 5g, various examples of outputs on a display unit 22, such as a mini-FID, are shown, wherein the outputs comprise multiple items of information, such as a current speed, an activated automatic distance and speed control function, a temperature and/or a charge state of a battery. It goes without saying that these outputs were only chosen as examples and that other expenses are also conceivable. In the following, the representations of notifications 24, 26 and indicator light symbols 38 will mainly be discussed. Where multiple notifications 24, 26 and/or indicator lights symbols 38 are output, these are arranged one above the other in a left-hand column and a right-hand column.

Figure 5A:
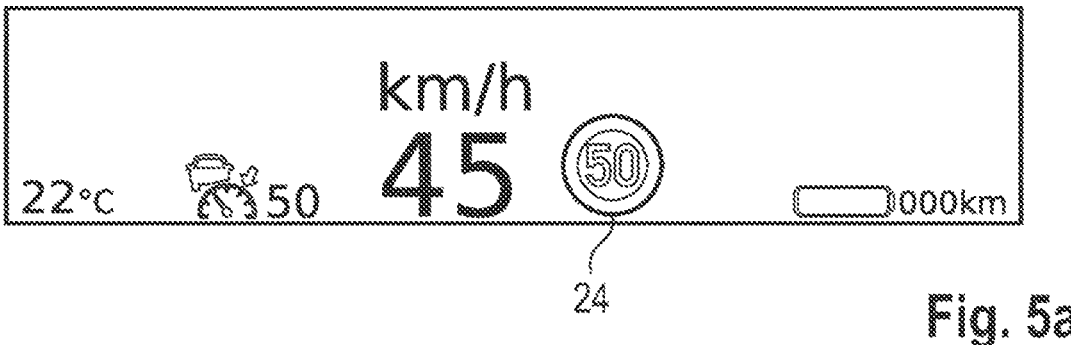
FIGS. 5a to 5g show schematic representations of outputs of the system on a mini-FID display unit.

FIG. 5a shows an output of a notification 24 as a pictogram of a traffic sign, wherein the pictogram conveys a permitted maximum speed of 50 km/h. In the example shown, no further outputs of notifications are necessary, therefore a complete, i.e., unreduced, representation 26 of the notification 24 can be displayed.

Figure 5B:
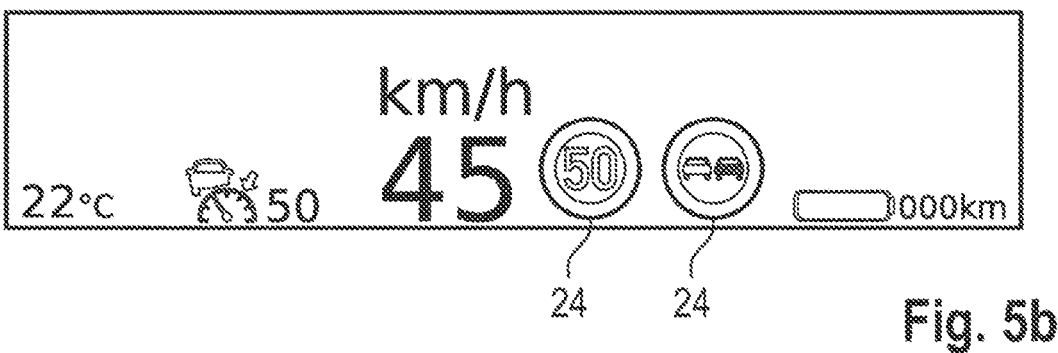

FIG. 5b, unlike the example shown in FIG. 5a, additionally shows an output of a notification 24 as a pictogram, which indicates an overtaking ban. The two notifications are each based on a recognized main traffic sign.

Figure 5C:
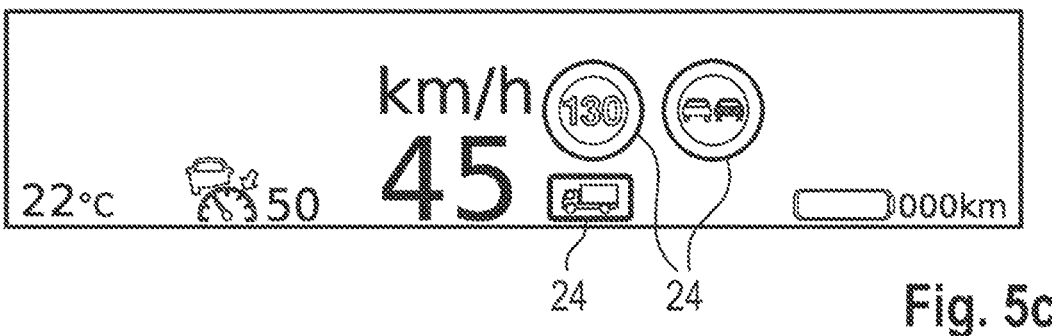

FIG. 5c, unlike the example shown in FIGS. 5a and 5b, additionally shows an output of a notification 24 as a pictogram, which indicates that a permitted maximum speed of 130 km/h applies to trucks. This additional pictogram is shown as a supplementary sign and is based on an appropriately recognized supplementary sign.

Figure 5D:
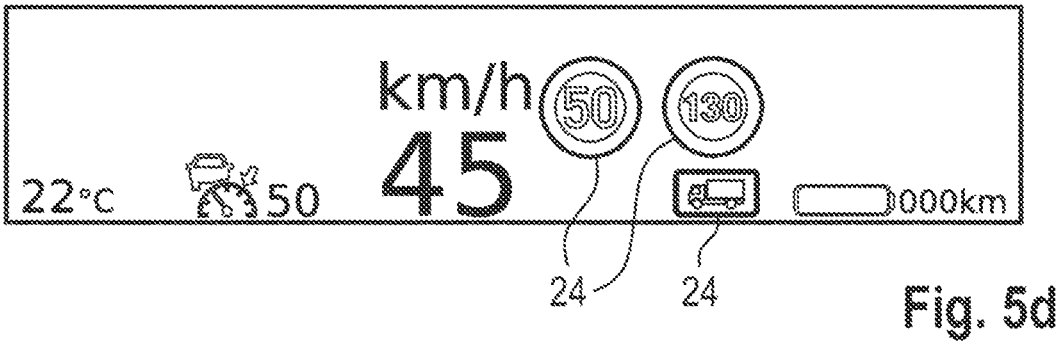
Figure 5E:
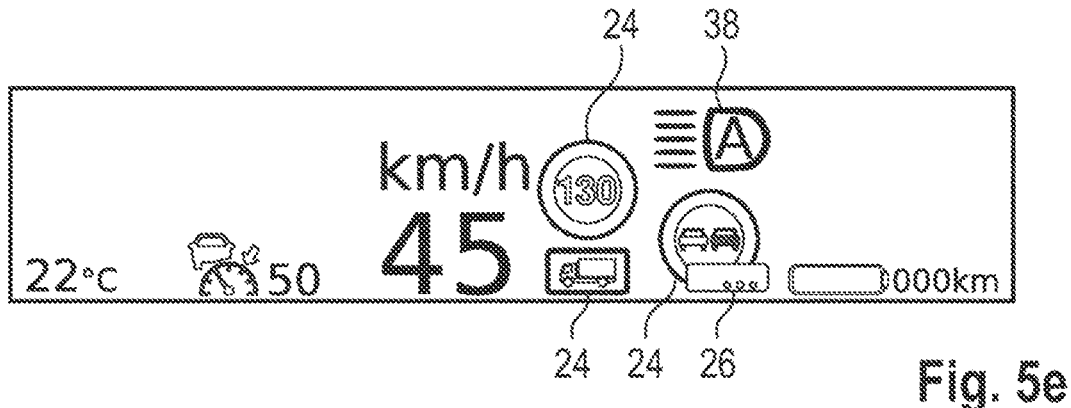

FIG. 5d, unlike the example shown in FIG. 5c, shows an output of notifications 24, such as pictograms, which indicate a permitted maximum speed of 130 km/h for trucks and a permitted maximum speed of 50 km/h for cars.

In contrast to the examples described above, FIG. 5e shows an output of notifications 24 and an output of an indicator light symbol 38. This means that the available display area is reduced, so that a recognized supplementary sign and/or main traffic sign is output in a reduced representation 26 of a notification. The pictograms indicate that a permitted maximum speed of 130 km/h applies to trucks and that overtaking is prohibited. The overtaking ban can be further specified by a supplementary sign and/or a further main traffic sign has been recognized. This information is conveyed to a driver by the reduced display 26 of a notification.

Figure 5F:
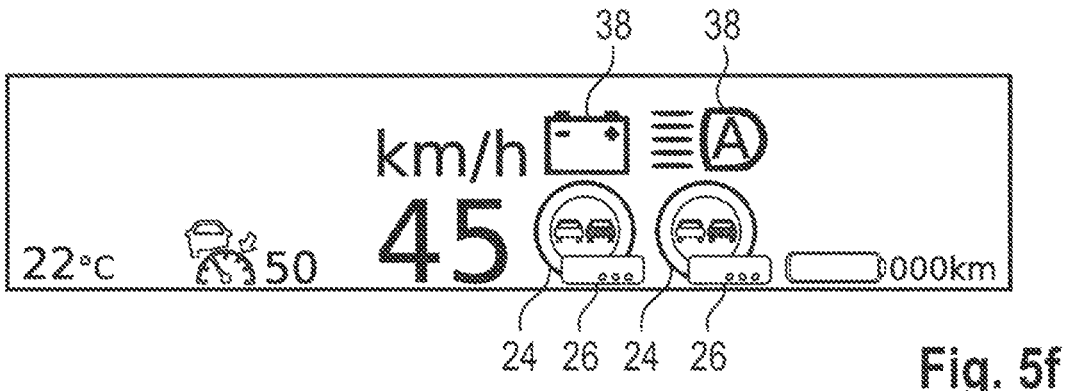

FIG. 5f shows an output of notifications 24 and an output of two indicator light symbols 38. As a result, the available display area is further reduced, so that a further recognized supplementary sign and/or a further recognized main traffic sign is output as a further reduced representation 26 of a notification. The pictograms indicate that an overtaking ban and a further overtaking ban apply, wherein the two overtaking bans can be further specified by a supplementary sign. This information is conveyed to a driver by the further reduced display 26 of a notification.

Figure 5G:
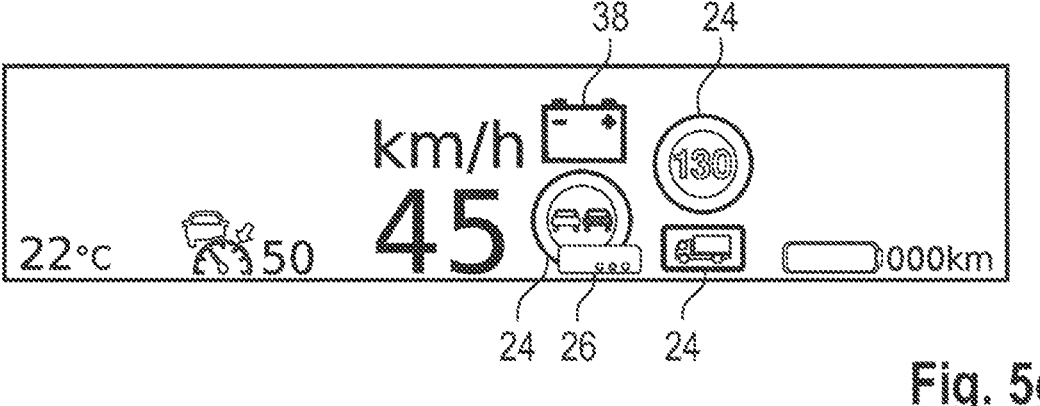

FIG. 5g shows an output of notifications 24 and an output of an indicator light symbol 38. In contrast to the example shown in FIG. 5e, the indicator light symbol is arranged on the left column. This likewise reduces the available display area. The pictograms indicate that a permitted maximum speed of 130 km/h applies to trucks and that overtaking is prohibited. The overtaking ban can be further specified by a supplementary sign and/or a further main traffic sign has been recognized. This information is conveyed to a driver by the reduced display 26 of a notification.

Figure 6:
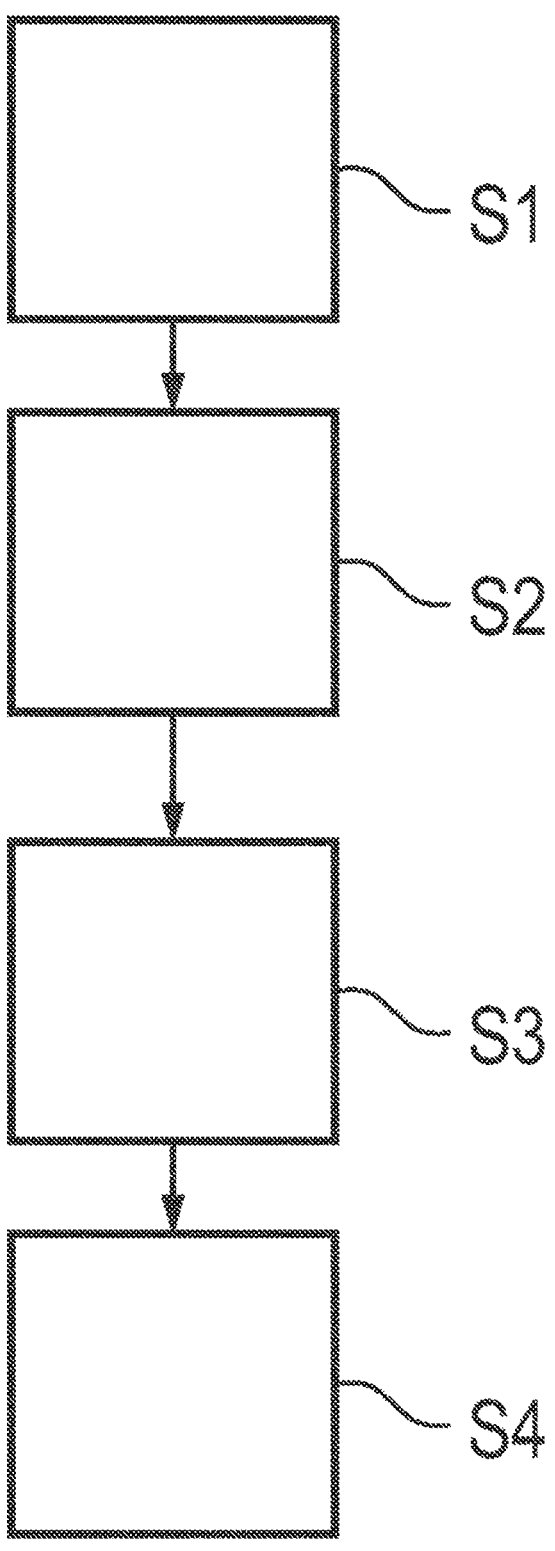
FIG. 6 shows a schematic representation of a disclosed method.

In FIG. 6, the disclosed method for improved visualization of a notification 24 in a transportation vehicle 28 are shown schematically.

In a first operation at S1, notification data containing information on the notification 24 and indicator light data containing information on an operating state of the transportation vehicle 28 is received.

In a second operation at S2, a representation for the notification 24 is determined based on the notification data and the indicator light data.

In a third operation at S3, a control command for controlling a display unit 22 of an instrument cluster 36 is generated.

In a fourth operation at S4, the control command is transmitted to the display unit 22 of the instrument cluster 36.

The control command displays an indicator light symbol 38 on a display panel of the display unit 22 when the operating state of the transportation vehicle 28 requires a message to be output by an indicator light symbol 38. If an indicator light symbol 38 is output, the control command displays the notification in a reduced form 26, since the available display area of the display panel is smaller than a display area required for a complete display of the notification 24.

The disclosure has been described in detail. In particular, the disclosed teaching may enable the following function: displaying traffic signs 34, supplementary signs and indicator lights 38 on the severely limited display space of a mini-FID in the instrument cluster 36. For this purpose, the information on the supplementary signs can be displayed in reduced form as soon as an indicator light, or an indicator light symbol 38, appears above the traffic signs or the notification 24 in the display area.

LIST OF REFERENCE SIGNS

10 device
12 input interface
14 analysis unit
16 output interface
18 system
22 display unit
24 notification
26 reduced display of a notification
28 transportation vehicle
30 unit for sign recognition
32 front camera
34 traffic sign
36 instrument cluster
38 Indicator light symbol
S1-S4 method operation

8

The invention claimed is:

1. A device for visualization of a notification for a transportation vehicle user in an instrument cluster of the transportation vehicle, the device comprising:
an input interface that receives notification data containing information on the notification and indicator light data containing information on an operating state of the transportation vehicle, wherein the input interface receives notification data with information relating to a traffic sign recognized by components of the transportation vehicle;
an analysis unit that determines a representation for the notification in response to on the notification data and the indicator light data and generates a control command that controls a display unit of the instrument cluster of the transportation vehicle; and
an output interface that transmits the control command to the display unit of the instrument cluster of the transportation vehicle,
wherein the control command controls display of an indicator light symbol on a display panel of the display unit in response to the analyzed indicator light data when the operating state of the transportation vehicle requires a message to be output by display of the indicator light symbol,
wherein the control command controls display of the notification in a complete form including a display of the recognized traffic sign in response to an available display area of the display panel being sufficiently large to output a complete display of the notification, and
wherein the control command controls display of the notification in a reduced form in response to the available display area of the display panel being smaller than a display area required for a complete display of the notification.

2. The device of claim 1, wherein the output interface transmits the control command to a display unit as a mini-FID and is installed in a transportation vehicle and is part of an on-board computer, infotainment and/or navigation system.

3. The device of claim 1, wherein the analysis unit determines whether a recognized traffic sign comprises a main sign and/or a supplementary sign based on the notification data.

4. The device of claim 1, wherein the analysis unit prioritizes a recognized main sign and/or a recognized supplementary sign, and determines a control command which displays the traffic sign with low priority as a reduced output of a notification as a placeholder.

5. The device of claim 1, wherein the analysis unit assigns a recognized supplementary sign a lower priority than a recognized main traffic sign.

6. The device of claim 1, wherein the analysis unit assigns an indicator light symbol a higher priority than a recognized traffic sign.

7. A system for improved visualization of a notification in an instrument cluster of a transportation vehicle, the system comprising:
the device of claim 1; and
a display unit in the instrument cluster for outputting an indicator light symbol and/or the notification in response to a control command of the device.

8. A method for visualization for a transportation vehicle user of a notification in an instrument cluster of the transportation vehicle, the method comprising:
receiving notification data with information on the notification and indicator light data with information on an operating state of the transportation vehicle, wherein the input interface receives notification data with information relating to a traffic sign recognized by components of the transportation vehicle;

determining a representation for the notification in response to the notification data and the indicator light data;

generating a control command for controlling a display unit of the instrument cluster of the transportation vehicle; and transmitting the control command to the display unit of the instrument cluster, wherein the control command controls display of an indicator light symbol on a display panel of the display unit in response to the analyzed indicator light data when the operating state of the transportation vehicle requires a message to be output by display of the indicator light symbol, wherein the control command controls display of the notification in a complete form including a display of the recognized traffic sign in response to an available display area of the display panel being sufficiently large to output a complete display of the notification, and wherein the control command controls display of the notification in a reduced form in response to the available display area of the display panel being smaller than a display area required for a complete display of the notification.

9. A non-transitory computer readable medium with a computer program having program code for performing the method of claim 8, when the computer program is executed on a computer or a corresponding computing unit.

10. The method of claim 8, wherein the output interface transmits the control command to a display unit as a mini-FID and is installed in a transportation vehicle and is part of an on-board computer, infotainment and/or navigation system.

11. The method of claim 8, wherein the analysis unit assigns a recognized supplementary sign a lower priority than a recognized main traffic sign.

12. The method of claim 8, wherein the analysis unit assigns an indicator light symbol a higher priority than a recognized traffic sign.

13. The method of claim 8, wherein the analysis unit determines whether a recognized traffic sign comprises a main sign and/or a supplementary sign based on the notification data.

14. The method of claim 8, wherein the analysis unit prioritizes a recognized main sign and/or a recognized supplementary sign, and determines a control command which displays the traffic sign with low priority as a reduced output of a notification as a placeholder.

* * * * *